United States Patent
Shibata

[11] Patent Number: 6,134,097
[45] Date of Patent: Oct. 17, 2000

[54] VARIABLE CAPACITOR

[75] Inventor: Yasunobu Shibata, Fukui, Japan

[73] Assignee: Murata Manufacturing Co., Ltd., Nagaokakyo, Japan

[21] Appl. No.: 09/148,987

[22] Filed: Sep. 8, 1998

[30] Foreign Application Priority Data

Sep. 8, 1997 [JP] Japan ..................................... 9-242304
Sep. 8, 1997 [JP] Japan ..................................... 9-242305

[51] Int. Cl.$^7$ ...................................................... H01G 5/06
[52] U.S. Cl. ................... 361/298.1; 361/289; 361/308.1; 361/310; 361/278
[58] Field of Search .................................... 361/287, 289, 361/290, 291, 292, 293, 298.1–298.5, 299, 299.1–299.5, 300, 306.1, 306.2, 306.3, 308.1, 308.2, 308.3, 309, 310, 277–278

[56] References Cited

U.S. PATENT DOCUMENTS

| 4,039,906 | 8/1977 | Wahi et al. | 361/287 |
| 4,181,923 | 1/1980 | Tatsumi et al. | 361/278 |
| 5,423,930 | 6/1995 | Kishishita | 156/89.12 |
| 5,461,535 | 10/1995 | Kishishita et al. | 361/298.1 |
| 5,867,360 | 2/1999 | Kishishita et al. | 361/292 |

FOREIGN PATENT DOCUMENTS

6-120079  4/1994  Japan .

Primary Examiner—Kristine Kincaid
Assistant Examiner—Eric Thomas
Attorney, Agent, or Firm—Burns, Doane, Swecker & Mathis, LLP

[57] ABSTRACT

A variable capacitor has a stator, a rotor, and a cover. The stator includes a stator electrode and a stator terminal connected electrically to the stator electrode. The rotor includes a rotor electrode facing the stator electrode with a dielectric disposed therebetween. The cover is shaped so as to accommodate and hold the rotor so that it can be rotated relative to the stator. An adjustment hole is formed in the cover so as to permit insertion of a tool for rotating the rotor. A spring-action portion is formed around the adjustment hole to thereby press the rotor against the stator. The stator terminal is formed so as not to extend onto a stator surface facing an edge portion of the cover, thereby maintaining a relatively long distance between the stator terminal and the edge portion of the cover and that between the stator terminal and the rotor. Thus, when the size or thickness of the variable capacitor is reduced, the problem of short circuiting or poor dielectric strength, which would otherwise tend to occur when the edge portion of the cover and the rotor are located in the proximity of the stator or when the cover or the rotor is dislocated during rotation of the rotor, can be effectively prevented. Also, rotor deformation can be prevented which would otherwise result from a pressing force applied to the rotor by the spring-action portion.

17 Claims, 6 Drawing Sheets

VARIABLE CAPACITOR

This application corresponds to Japanese Patent Application Nos. 9-242304 and 9-242305, both filed on Sep. 8, 1997, and both of which are hereby incorporated by reference in theirs entireties.

BACKGROUND OF THE INVENTION

1. Field of the Invention

The present invention relates to a variable capacitor, and particularly to a variable capacitor in which the effective overlapping area between a stator electrode and a rotor electrode is varied through rotation of the rotor electrode relative to the stator electrode to thereby vary capacitance.

2. Description of the Related Art

Figure 13A:
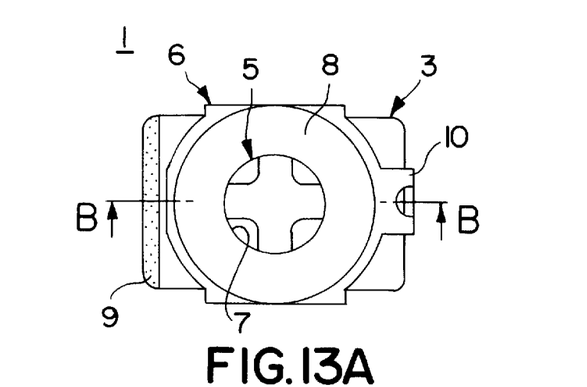
FIG. 13(A) is a top view of a variable capacitor for comparison with the present invention.
Figure 13B:
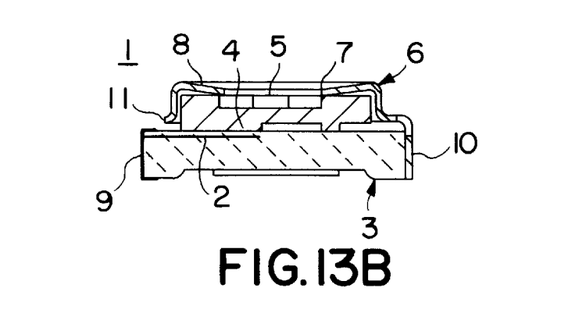
FIG. 13(B) is a sectional view taken along the line B—B of FIG. 13(A)

One type of variable capacitor is disclosed in Japanese Patent Application Laid-Open (kokai) No. 6-120079. FIGS. 13(A) and 13(B) show the variable capacitor disclosed in that publication.

As shown in FIGS. 13(A) and 13(B), a variable capacitor 1 is composed of a stator 3 and a rotor 5. The stator 3 has a stator electrode 2 formed therein and is formed of a ceramic dielectric. The rotor 5 has a rotor electrode 4 formed on its bottom side (as viewed in FIG. 13(B)) and is formed of a metal. The rotor electrode 4 faces the stator electrode 2 via a portion of the ceramic dielectric constituting the stator 3.

A metallic cover 6 secures the rotor 5 so that it can be rotated relative to the stator 3 so as to vary the effective overlapping area between the rotor electrode 4 and the stator electrode 2. The cover 6 is shaped so as to accommodate the rotor 5 rotatably, and is attached onto the stator 3.

The cover 6 has an adjustment hole 7 formed therein so as to permit insertion of a tool for rotating the rotor 5. The cover 6 also has a spring-action portion 8 formed around the adjustment hole 7 for pressing the rotor 5 against the stator 3. The spring-action portion 8 is shaped in such as manner as to incline downward (as viewed in FIG. 13(B)) toward the center of the adjustment hole 7, thereby applying a spring force by means of a metallic material present around the adjustment hole 7.

In the thus-configured variable capacitor 1, in order to form capacitance between the stator electrode 2 and the rotor electrode 4, which oppose each other, a stator terminal 9 and a rotor terminal 10 are provided. The stator terminal 9 is provided on an end surface of the stator 3 and is formed of a conductive film which is electrically connected to the stator electrode 2. The rotor terminal 10 is integrally formed with the conductive cover 6, which is in contact with the rotor 5, with the rotor electrode 4 formed thereon. Accordingly, the capacitance of this device can be sampled (e.g., connected to an external circuit) between the stator terminal 9 and the rotor terminal 10. Through rotation of the rotor 5, the effective overlapping area between the stator electrode 2 and the rotor electrode 4 is varied, so that the capacitance is varied accordingly.

Figure 15:
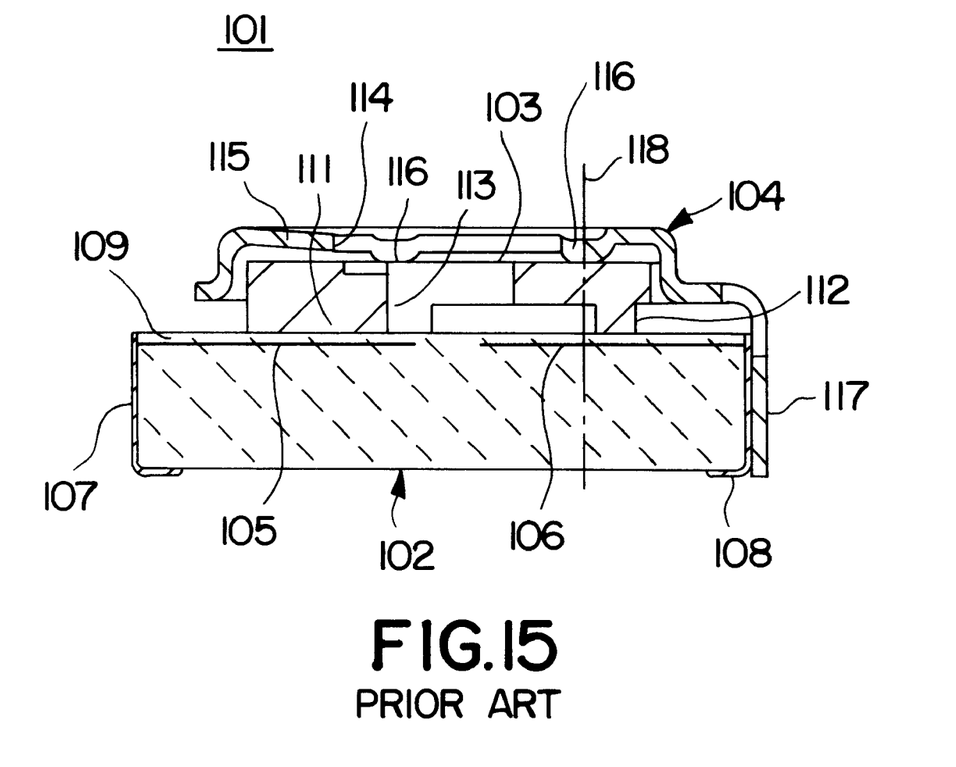
FIG. 15 is a sectional view of another variable capacitor for comparison with the present invention.

Another variable capacitor is described in Japanese Patent Application No. 9-126586 filed on May 16, 1997 by the applicant of the present invention. FIG. 15 shows a variable capacitor 101 disclosed in that application for patent.

As shown in FIG. 15, the variable capacitor 101 is primarily composed of a stator 102, a rotor 103, and a cover 104. A major portion of the stator 102 is formed of a dielectric, such as ceramic. The rotor 103 is formed of a metal, such as brass. The cover 104 is formed of a metal, such as stainless steel or copper alloy.

The above-mentioned elements of the variable capacitor 101 will next be described in detail.

The stator 102 generally has a symmetrical structure. Stator electrodes 105 and 106 are formed side by side in the stator 102. Stator terminals 107 and 108 are formed of a conductive film on the outer surfaces of corresponding end portions of the stator 102 so as to establish electrical connection with the stator electrodes 105 and 106, respectively. A portion of the dielectric, which the stator 102 is made of, defines a dielectric 109 covering the stator electrodes 105 and 106.

As described above, the two stator electrodes 105 and 106 and the two stator terminals 107 and 108 are formed so as to impart a symmetrical structure to the stator 102, so that orientation of the stator 102 need not be a consideration during the assembly of the variable capacitor 101.

Figure 16:
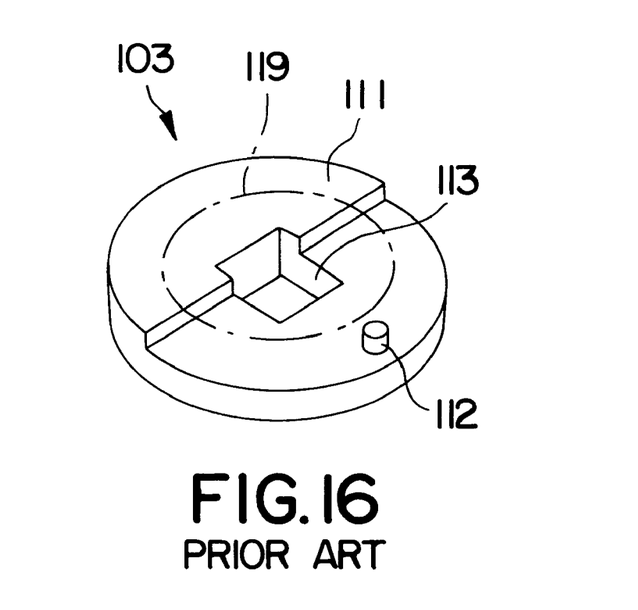
FIG. 16 is a perspective bottom view of the rotor used in the variable capacitor of FIG. 15.

The rotor 103 is placed on the stator 102 in such a manner that the rotor 103 comes into contact with the outer surface of the dielectric layer 109. A substantially semicircular rotor electrode 111 projects from the bottom side (as viewed in FIG. 15) of the rotor 103 so as to face the stator electrode 105 (or 106) with the dielectric layer 109 disposed therebetween. FIG. 16 shows a bottom view of the rotor 103.

A protrustion 112 is also included, which projects out as far as the rotor electrode 111. This protrustion 112 is formed on the bottom side of the rotor 103 in a region other than that where the rotor electrode 111 is formed. The protrusion 112 serves to prevent an inclination of the rotor 103 which would otherwise result due to the presence of the rotor electrode 111.

A driver groove 113, which assumes a form of, for example, a square through-hole, is formed in the rotor 103 in order to receive a driver or a like tool used for rotating the rotor 103.

The cover 104 is attached onto the stator 102 while accommodating the rotor 103. The cover 104 holds the rotor 103 so that the rotor 103 can rotate relative to the stator 102. The cover 104 has an adjustment hole 114 formed therein that allows the driver groove 113 to be exposed therethrough. Thus, when the rotor 103 is to be rotated, a driver or a tool can be inserted into the driver groove 113 through the adjustment hole 114.

The cover 114 has a spring-action portion 115 formed around the adjustment hole 114. The spring-action portion 115 is partially in contact with the upper surface (as viewed in FIG. 15) of the rotor 103 to thereby apply a spring force for pressing the rotor 103 against the stator 102. The spring-action portion 115 is formed in such a manner as to incline downward toward the center of the adjustment hole 114, thereby affecting a spring force by means of a metallic material present around the adjustment hole 114.

A plurality of protrusions 116 are formed on the spring-action portion 115 at equal intervals along a rotational direction of the rotor 103 (e.g., a direction defined by the rotation of the rotor 103). These protrusions 116 substantially come into point contact with the rotor 103. These protrusions 116 can be formed through, for example, embossing a metallic plate which constitutes the cover 104.

The cover 104 also has a rotor terminal 117 extending downward (as viewed in FIG. 15).

Through use of the above-mentioned stator 102, rotor 103, and cover 104, the variable capacitor 101 is assembled in the following manner.

The rotor 103 is placed on the stator 102, and then the cover 104 is placed on the stator 102 in such a manner as to cover the rotor 103. Next, the cover 104 is attached onto the stator 102 while being pressed toward the stator 102 so as to press the rotor 103 against the stator 102.

In this case, the rotor terminal 117 integrated with the cover 104 is positioned to face the stator terminal 108 provided on the stator 102. In the structure illustrated in FIG. 15, the stator terminal 108 does not function as a stator terminal in the same manner as stator terminal 107, and thus no electrical problem will arise due the above-described electrical connection.

In the thus-assembled state, the rotor electrode 111 faces the stator electrode 105 with the dielectric layer 109 disposed therebetween to thereby develop capacitance. In order to vary the capacitance through varying the effective overlapping area between the rotor electrode 111 and the stator electrode 105, the rotor 103 is rotated. The capacitance can be externally "tapped" between the stator terminal 107 and the rotor terminal 117. The stator terminal 107 is electrically connected to the stator electrode 105. The rotor terminal 117 is integrated with the cover 104 which is in contact with the rotor 103 on which the rotor electrode 171 is formed.

In the variable capacitor 101, the protrusions 116 formed on the spring-action portion 115 of the cover 104 are substantially in point contact with the rotor 103. Accordingly, the protrusions 116 press the rotor 103 at reliably fixed positions. Even when the parallelism of the rotor 103 between the rotor-electrode side and the opposite side is poor or when the flatness of the rotor-electrode side or the opposite side of the rotor 103 or the flatness of a tip portion of the spring-action portion 115 is poor, a contact pressure can be applied in a stable manner to the rotor 103. In other words, these variations in machining do not appreciably affect the performance of the variable capacitance and are thereby effectively "absorbed."

Thus, the rotor 103 is uniformly pressed against the stator 102 over the entire surface of the rotor 103. Therefore, the capacitance of the variable capacitor 101 is stabilized and varies smoothly with rotation of the rotor 103. Also, the drift in the set position is stabilized and the torque required to rotate the rotor 103 becomes uniform.

However, the above-described variable capacitor 1 involves at least the following problems.

As mentioned previously, the cover 6 is shaped so as to accommodate the rotor 5, producing a resultant opposed arrangement between an edge portion 11 of the cover 6 and the stator 3.

As mentioned previously, a conductive film formed on an end surface of the stator 3 serves as the stator terminal 9. The conductive film is generally formed in the following manner. The corresponding end portion of the stator 3 is thrust into a conductive paste layer having a predetermined thickness to thereby apply the conductive paste onto the end portion of the stator 3. The thus-applied conductive paste is then subjected to baking so that it becomes fixed to the stator 3.

Figure 14:
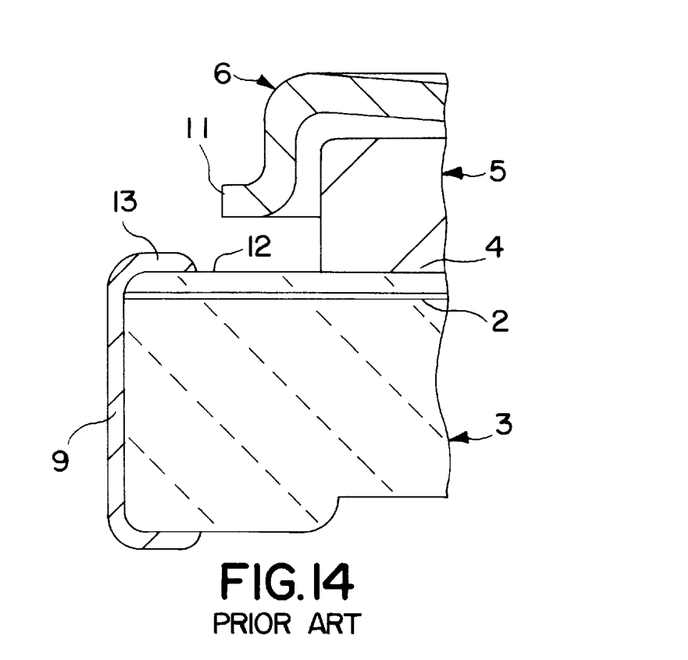
FIG. 14 is a partially enlarged view of the variable capacitor of FIG. 13(B)

As a result of forming the stator terminal 9 by the above-mentioned method, as seen well in FIG. 14 showing a partially enlarged view of FIG. 13(B), the stator terminal 9 formed on an end surface of the stator 3 partially extends onto surfaces adjacent to the end surface. Particularly, with regard to a surface 12 of the stator 3 which faces the lower surface of the rotor 5, the stator terminal 9 includes a portion 13 extending onto the surface 12.

Accordingly, the edge portion 11 of the cover 6 or a circumferential surface of the rotor 5 directly faces the portion 13 of the stator terminal 9. In the variable capacitor 1, the cover 6 and the rotor 5 have an electric potential identical to that of the rotor electrode 4, while the stator terminal 9 has an electric potential identical to that of the stator electrode 2. As a result, if a short circuit occurs between the portion 13 of the stator terminal 9 and the edge portion 11 of the cover 6 or between the portion 13 of the stator terminal 9 and the circumferential surface of the rotor 5, the variable capacitor 1 may be disabled. In order to prevent such a short circuit or to improve dielectric strength, the distance between the portion 13 of the stator terminal 9 and the edge portion 11 of the cover 6 or that between the portion 13 of the stator terminal 9 and the circumferential surface of the rotor 15 is increased as much as possible.

However, when the size or height of the variable capacitor 1 is to be reduced, the distance between the portion 13 of the stator terminal 9 and the edge portion 11 of the cover 6 or that between the portion 13 and the circumferential surface of the rotor 5 may be unavoidably decreased. The size of the variable capacitor 1 can be effectively reduced through reduction of, for example, a dimension of the stator 3 as measured in a right-and-left direction in FIG. 13(A) or 13(B). In this case, if the diameter of the rotor 5 is reduced, an available maximum capacitance decreases; thus, a reduction in the diameter of the rotor 5 is avoided as much as possible in order to maintain a certain maximum capacitance. Accordingly, when the size of the variable capacitor 1 is to be reduced while a certain maximum capacitance is maintained, only the dimension of the stator 3 as measured in the right-and-left direction of FIG. 13(A) or 13(B) is reduced. As a result, the distance between the portion 13 of the stator terminal 9 and the edge portion 11 of the cover 6 and the distance between the portion 13 of the stator terminal 9 and the circumferential surface of the rotor 5 are unavoidably decreased.

Consequently, if there occurs a positioning error between the stator 3 and the rotor 5 or between the stator 3 and the cover 6 in assembly of the variable capacitor 1, or a dislocation of the cover 6 or rotor 5 during rotation of the rotor 5, a short circuit or deterioration of the dielectric strength occurs between the portion 13 of the stator terminal 9 and the end portion 11 of the cover 6 or between the portion 13 and the circumferential surface of the rotor 5.

Further, when the variable capacitor 101 is to be made thinner, thinning of the rotor 103 is effective. However, when the rotor 103 is thinned to a thickness of 0.3 mm or less, a pressing force applied to the rotor 103 by the spring-action portion 115 may cause the rotor 103 to deform. Particularly, as in the case of the variable capacitor 101 shown in FIG. 15 in which protrusions 116 are formed on the spring-action portion 115, the pressing force is applied to the rotor 103 in a localized narrow region. Thus, the rotor 103 is known to be susceptible to deformation. Such an undesirable deformation of the rotor 103 hinders smooth capacitance variation affected through rotation of the rotor 103, typically causing a problem that the linearity of the capacitance variation is impaired, causing, in turn, a resultant drift in setting position.

In FIG. 15, the dot-and-dash line represents the position of a section of the spring-action portion 115 of the cover 104, which section comes into contact with the rotor 103. More specifically, the line represents the position of a contact portion 118 of the protrusion 116 formed on the spring-action portion 115, which contact portion 118 comes into contact with the rotor 103. As the rotor 103 rotates, the contact portion 118 sweeps out a circular trajectory 119 on the rotor 103 as represented by the dot-and-dash line in FIG. 16. FIG. 16 is a bottom view of the rotor 103 of FIG. 15. The circular trajectory 119 is a projection on the bottom side of the rotor 103 of a circular trajectory which is swept out on the upper surface (as viewed in FIG. 15) of the rotor 103 by the contact portion 118.

As shown in FIGS. 15 and 16, the protrusion 112 formed on the bottom side of the rotor 103 is not positioned on the circular trajectory 119, but is positioned outside the circular trajectory 119. Accordingly, a pressing force applied to the rotor 103 by the spring-action portion 115 through the protrusion 116 acts on a portion of the rotor 103 located between the protrusion 112 and the rotor electrode 111, causing the rotor 103 to deform in a flexural manner.

SUMMARY OF THE INVENTION

An object of the present invention is to provide a variable capacitor capable of solving at least the above-mentioned problems of short circuiting and poor dielectric strength and to provide a variable capacitor capable of solving the above-mentioned problem of undesirable rotor deformation.

A variable capacitor according to a first aspect of the present invention comprises a stator, a rotor, and a conductive cover. The stator includes a stator electrode and a stator terminal connected electrically to the stator electrode. The rotor includes a rotor electrode facing the stator electrode with a dielectric disposed therebetween. The conductive cover is shaped so as to accommodate and hold the rotor such that the rotor can be rotated relative to the stator for changing the effective overlapping area between the rotor electrode and the stator electrode. The conductive cover is attached to the stator such that the edge portion of the conductive cover faces the stator, and the conductive cover is electrically connected to the rotor electrode. The stator terminal is formed in such a manner as not to extend onto a surface of the stator which faces the edge portion of the cover.

Since the stator terminal is formed so as not to extend onto the stator surface facing the edge portion of the cover, a relatively long distance can be maintained between the stator terminal and the edge portion of the cover and between the stator terminal and a circumferential surface of the rotor. Accordingly, even when positioning between the stator and the rotor or between the stator and the cover involves an error in assembly of the variable capacitor or when the cover or the rotor is dislocated during rotation of the rotor, the potential for short circuiting or deterioration of the dielectric strength can be reduced. Thus, the size or height of the variable capacitor can be reduced with less susceptibility to the problem of short circuiting or poor dielectric strength.

The present invention is advantageously applied to the case where the stator is formed of a dielectric and is configured such that the stator electrode is internally formed and such that the stator terminal is formed on a surface of the stator.

In this case, when an attainable maximum capacitance is to be increased through reduction of the distance between the stator electrode and the rotor electrode, the stator electrode formed in the stator must be located in the proximity of the rotor or cover. As a result, the stator terminal connected electrically to the stator electrode is also located in the proximity of the rotor or cover. Thus, a design tends to be employed in which the stator terminal extends onto a surface of the stator which faces the cover edge portion, resulting in greater susceptibility to a problem of short circuiting or poor dielectric strength. Therefore, the previously-mentioned design in which the stator terminal does not extend onto the stator surface which faces the cover edge portion is very effective for avoiding such a problem of short circuiting or poor dielectric strength.

Preferably, in the case where the stator terminal is provided by a conductive film formed on a surface of the stator, the conductive film is partially removed such that the conductive film does not extend onto the surface of the stator which faces the edge portion of the cover. In this case, the formation of the conductive film can be performed efficiently.

Also, the present invention is advantageously applied to the case where an adjustment hole is formed in the cover so as to permit insertion of a tool for rotating the rotor, and a spring-action portion is formed around the adjustment hole in such a manner as to come into contact with the rotor to thereby press the rotor against the stator.

Since the variable capacitor having the above-described structure is advantageous to reduction in size and height, the effect of the present invention, i.e., reducing susceptibility to the previously-mentioned problem of short circuiting or poor dielectric strength, becomes more significant when the present invention is applied to such a variable capacitor.

A variable capacitor according to a second aspect of the present invention comprises a stator, a conductive rotor, a conductive cover, and a spring-action portion. The stator includes a stator electrode, a stator terminal connected electrically to the stator electrode, and a dielectric layer formed so as to cover the stator electrode. The conductive rotor is placed on the stator in such a manner as to come into contact with an outer surface of the dielectric layer. A rotor electrode projects from a surface of the rotor facing the outer surface of the dielectric layer so as to face the stator electrode with the dielectric layer disposed therebetween. A protrusion projecting out as far as the rotor electrode is formed on the surface of the rotor in a region other than that where the rotor electrode is formed. In order to vary the effective overlapping area between the rotor electrode and the stator electrode, the rotor is held so that it can be rotated relative to the stator. A conductive cover is attached onto the stator such that the edge portion of the cover faces the stator, and is electrically connected to the rotor electrode. A spring-action portion is in contact with a surface of the rotor opposite the surface of the rotor on which the rotor electrode and the protrusion are formed, to thereby apply a spring force for pressing the rotor against the stator. The stator terminal is formed in such a manner as not to be extend onto a surface of the stator which faces the edge portion of the cover. A position of the protrusion is selected so as to substantially fall on a circular trajectory which is swept out on the rotor by a section of the spring-action portion which is in contact with the rotor as the rotor rotates. Accordingly, a pressing force applied to the rotor by the spring-action portion acts on the rotor at a position corresponding to the protrusion.

Further, even when the rotor is made thinner in order to obtain a thin variable capacitor, a flexure of the rotor can be suppressed which would otherwise result from application of the pressing force to the rotor by the spring-action portion. As a result, the capacitance of the variable capacitor can be smoothly varied through rotation of the rotor, and the linearity of capacitance variation is improved, thereby stabilizing a drift in the setting position.

In the present invention, the protrusion may assume any of various forms. For example, the protrusion can extend in a circular arc form along the above-mentioned circular trajectory. In this case, the protrusion can extend integrally from the rotor electrode, can extend in a continuous circular arc form, or can extend in an intermittent circular arc form. Alternatively, a plurality of protrusions can be formed along the circular trajectory.

When the protrusion extends in a circular arc form along the circular trajectory, the mechanical strength of the rotor can be improved by virtue of a rib effect.

When the protrusion extends integrally from the rotor electrode, the protrusion can be easily formed over a wide angular range along the circular trajectory. Also, when the protrusion extends in a continuous circular arc form, the protrusion can be easily formed over a wide angular range along the circular trajectory. As a result of forming the protrusion over a wide angular range along the circular trajectory, even when the spring-action portion is in intermittent contact with the rotor, the protrusion can be located at a position corresponding to a position of contact between the spring-action portion and the rotor over a wide angular range of rotor rotation. Thus, the protrusion's effect of preventing deformation of the rotor is further enhanced.

When the protrusion extends integrally from the rotor electrode and in a continuous circular arc form, even when the spring-action portion is in intermittent contact with the rotor, either the protrusion or the rotor electrode can be located at a position corresponding to a position of contact between the spring-action portion and the rotor over the entire range of rotor rotation. This form of the protrusion is thus effective in preventing rotor deformation.

When the protrusion extends in an intermittent circular arc form of a plurality of protrusions are arranged along the circular trajectory, the area of contact between the protrusions and the dielectric layer can be reduced, thereby preventing an undesirable increase in the minimum capacitance of a variable capacitor.

Further, the present invention is advantageously applied to the case where the variable capacitor further comprises a cover shaped so as to accommodate and hold the rotor rotatable relative to the stator, wherein an adjustment hole is formed in the cover so as to permit insertion of a tool for rotating the rotor, and the spring-action portion is formed around the adjustment hole. This structure is effective for obtaining a thin variable capacitor which is not subject to rotor deformation.

In the variable capacitor having the above-described specific structure, it is preferred that the spring-action portion have a protrusion which substantially comes into point contact with the rotor. More preferably, the spring-action portion has at least the three protrusions arranged along a rotational direction of the rotor.

When the spring-action portion has protrusions that come into substantial point contact with the rotor, the spring-action portion applies a pressing force to the rotor only in a limited region, so that the pressing force is likely to cause the rotor to deform. Therefore, the effect of the present invention of preventing rotor deformation becomes significant, when the present invention is applied to such a variable capacitor. Further, formation of the protrusion enables the spring-action portion to apply a spring force on the rotor in a stable manner, so that stable contact can be established between the rotor and the stator.

Also, when at least the three protrusions are formed on the spring-action portion along a rotational direction of the rotor, the state of contact between the protrusions and the rotor is more stabilized.

BRIEF DESCRIPTION OF THE DRAWINGS

The foregoing, and other, objects, features and advantages of the present invention will be more readily understood upon reading the following detailed description in conjunction with the drawings in which.

DESCRIPTION OF THE PREFERRED EMBODIMENTS

Embodiments of the present invention will next be described with reference to the drawings. Like reference numbers denote like or similar features.

FIGS. 1 to 7 illustrate a variable capacitor 21 according to a first embodiment of the present invention.

The variable capacitor 21 is primarily composed of a stator 22, a rotor 23, and a cover 24. A major portion of the stator 22 is formed of a dielectric, such as ceramic. The rotor 23 is formed of a metal, such as brass or like material. The cover 24 is formed of a metal, such as stainless steel or copper alloy or like material, and may be surface-treated with solder, tin, silver, or a like metal at an appropriate portion in order to improve solderability.

The above-mentioned elements of the variable capacitor 21 will next be described in detail.

As shown in FIGS. 1 to 4, the stator 22 generally has a symmetrical structure. Stator electrodes 25 and 26 are formed side by side in the stator 22. Stator terminals 27 and 28 are formed of a conductive film on the outer surfaces of corresponding end portions of the stator 22 so as to establish electric connection with the stator electrodes 25 and 26, respectively.

As described above, the two stator electrodes 25 and 26 and the two stator terminals 27 and 28 are formed so as to impart a symmetrical structure to the stator 22, so that orientation of the stator 22 need not be a consideration in assembly of the variable capacitor 21. If such a benefit is not desired in a particular application, either the stator electrode 25 or the stator electrode 26 and the associated stator terminal 27 or 28 can be omitted.

Figure 1:
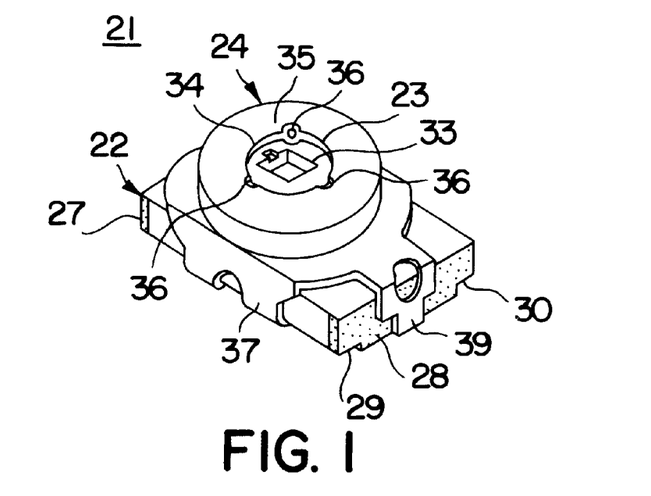
FIG. 1 is a perspective top view of a variable capacitor according to a first exemplary embodiment of the present invention.
Figure 2:
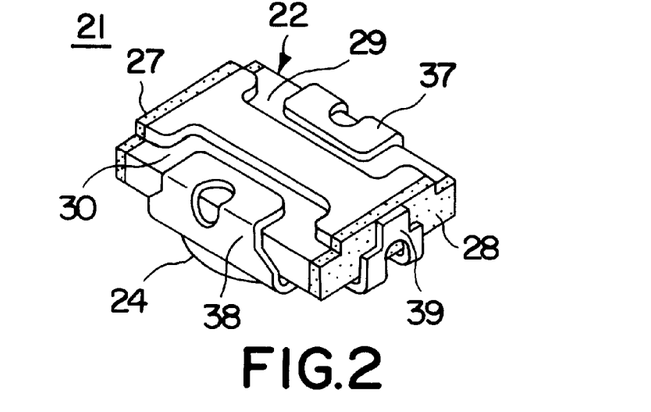
FIG. 2 is a perspective bottom view of the variable capacitor of FIG. 1.

As shown in FIG. 1, depressions 29 and 30 are formed in the lower surface of the stator 22 in such a manner as to extend inward from both opposed edges of the stator 22.

As shown in FIG. 1 and FIGS. 3 to 5, the rotor 23 is disposed on the upper surface of stator 22. A substantially semicircular rotor electrode 31 projects from the lower surface of the rotor 23. Also, a protrusion 32 projects out as far as the rotor electrode 31, and is formed on the lower surface of the rotor 23 so as to prevent an inclination of the rotor 23 which would otherwise result due to the presence of the rotor electrode 31.

Figure 5:
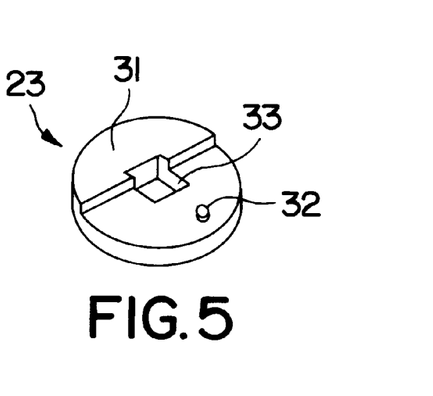
FIG. 5 is a perspective bottom view of the rotor shown in FIG. 4.

A driver groove 33 is formed in the rotor 23 in order to receive a driver or a like tool used for rotating the rotor 23. In the present embodiment, the driver groove 33 assumes a form of a square through-hole.

As shown in FIGS. 1 to 4, the cover 24 is attached onto the stator 22 while accommodating the rotor 23. The cover 24 holds the rotor 23 so that the rotor 23 can be rotated relative to the stator 22. The cover 24 has an adjustment hole 34 formed therein that allows the driver groove 33 to be exposed therethrough. Thus, when the rotor 23 is to be rotated, a driver or a like tool can be inserted into the driver groove 33 through the adjustment hole 34.

The cover 24 has a spring-action portion 35 formed around the adjustment hole 34. The spring-action portion 35 is in contact with the rotor 23 to thereby press the rotor 23 against the stator 22. The spring-action portion 35 is formed in such a manner as to incline downward (as viewed in FIG. 3) toward the center of the adjustment hole 34, thereby applying a spring force by means of a metallic material present around the adjustment hole 34.

Figure 3:
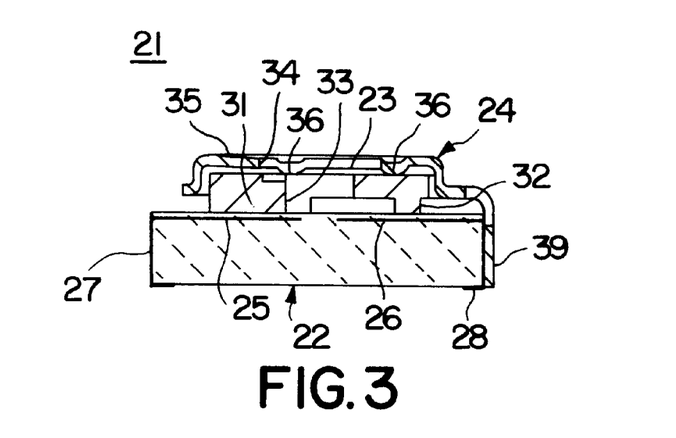
FIG. 3 is a sectional view of the variable capacitor of FIG. 1.
Figure 4:
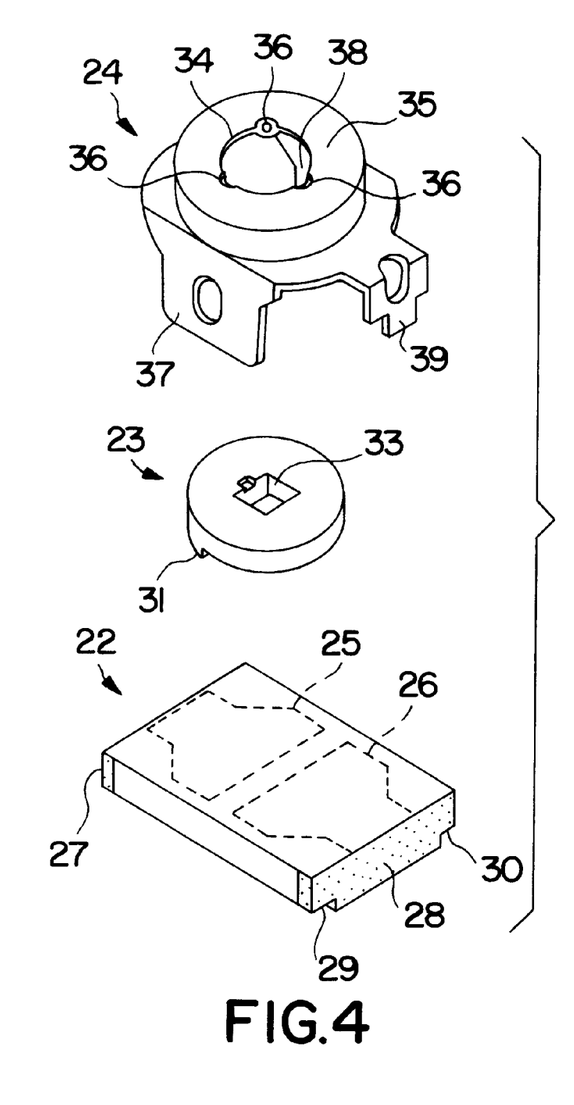
FIG. 4 is an exploded view of the variable capacitor of FIG. 1.

A plurality of protrusions 36 are preferably formed on the spring-action portion 35. These protrusions 36 substantially come into point contact with the rotor 23, so that the spring-action portion 35 comes into contact with the rotor 23 at a plurality of independent positions. In the present embodiment, three protrusions 36 are formed along a rotational direction of the rotor 23 at equal intervals. These protrusions 36 can be formed through, for example, embossing a metallic plate which constitutes the cover 24.

The cover 24 has a pair of engagement pieces 37 and 38 extending downward (as viewed in FIG. 1) and facing each other. The engagement pieces 37 and 38 are bent inward during the assembly procedure, which will be described later, so as to engage with the depressions 29 and 30 formed in the lower surface (as viewed in FIG. 1) of the stator 22. In order to facilitate the bending operation, a hole is formed in the engagement pieces 37 and 38.

Also, the cover 24 has a rotor terminal 39 extending downward (as viewed in FIG. 1) at a position different from those of the engagement pieces 37 and 38.

Through use of the above-mentioned stator 22, rotor 23, and cover 24, the variable capacitor 21 is assembled in the following manner.

The rotor 23 is placed on the stator 22, and then the cover 24 is placed on the stator 22 in such a manner as to cover the rotor 23. Next, while the cover 24 is pressed toward the stator 22 so as to press the rotor 23 against the stator 22, the engagement pieces 37 and 38 of the cover 24 are bent inward to thereby engage with depressions 29 and 30, respectively, formed in the lower surface (as viewed in FIG. 1) of the stator 22.

In this case, the rotor terminal 39 integrated with the cover 24 is positioned to face the stator terminal 28 provided on the stator 22 (in the illustrated embodiment of FIGS. 1 to 4, the stator terminal 28 does not function as a stator terminal). Accordingly, the rotor terminal 39 and the stator terminal 28 may be soldered (not illustrated) to thereby enhance the adhesion of the cover 24 onto the stator 22 and make the stator terminal 28 serve as a rotor terminal.

Thus, the variable capacitor 21 has been assembled.

In the thus-assembled state, as shown in FIG. 3, the rotor electrode 31 faces the stator electrode 25 via a portion of the dielectric which constitutes the stator 22, to thereby develop capacitance. In order to vary the capacitance through varying the effective overlapping area between the rotor electrode 31 and the stator electrode 25, the rotor 23 is rotated. The capacitance can be externally "tapped" between the stator terminal 27 and the rotor terminal 39. The stator terminal 27 is electrically connected to the stator electrode 25. The rotor terminal 39 is integrated with the cover 4 which is in contact with the rotor 23 on which the rotor electrode 31 is formed.

In the assembled variable capacitor 21, by means of the protrusions 36 formed on the spring-action portion 35 of the cover 24, the spring-action portion 35 can affect a stable spring action force on the rotor 23. Accordingly, stable contact is established between the rotor 23 and the stator 22. Thus, the rotor 23 is uniformly pressed against the stator 22 over the entire surface of the rotor 23. Therefore, the capacitance of the variable capacitor 21 is stabilized and varies smoothly with rotation of the rotor 23. Also, the drift in the setting position is stabilized, and the torque required to rotate the rotor 23 becomes uniform.

In the thus-configured capacitor 1, as mentioned previously, the cover 24 is shaped so as to accommodate the rotor 23. As a result, as shown in FIG. 7, an edge portion 40 faces the stator 22.

As mentioned previously, conductive films formed on end surfaces of the stator 22 serve as the stator terminals 27 and 28. Each conductive film is generally formed in the following manner. The corresponding end portion of the stator 22 is thrust into a conductive paste layer having a predetermined thickness to thereby apply the conductive paste onto the end portion of the stator 22. The thus-applied conductive paste is then subjected to baking which fixes the conductive paste onto the stator 22.

As a result of forming the stator terminals 27 and 28 by the above-mentioned method, the stator terminals 27 and 28 formed on the end surfaces of the stator 22 partially extend onto surfaces adjacent to the end surfaces of the stator 22. That is, the stator terminals 27 and 28 are generally formed such that they extend onto a surface 41 of the stator 22 which faces the lower surface of the rotor 23. However, in the present embodiment, the stator terminals 27 and 28 are formed so as not to extend onto the surface 41. That is, portions of the stator terminals 27 and 28 are removed from the surface 41 by polishing, lapping, or like processing after the stator terminals 27 and 28 are formed.

Figures 6, 7:
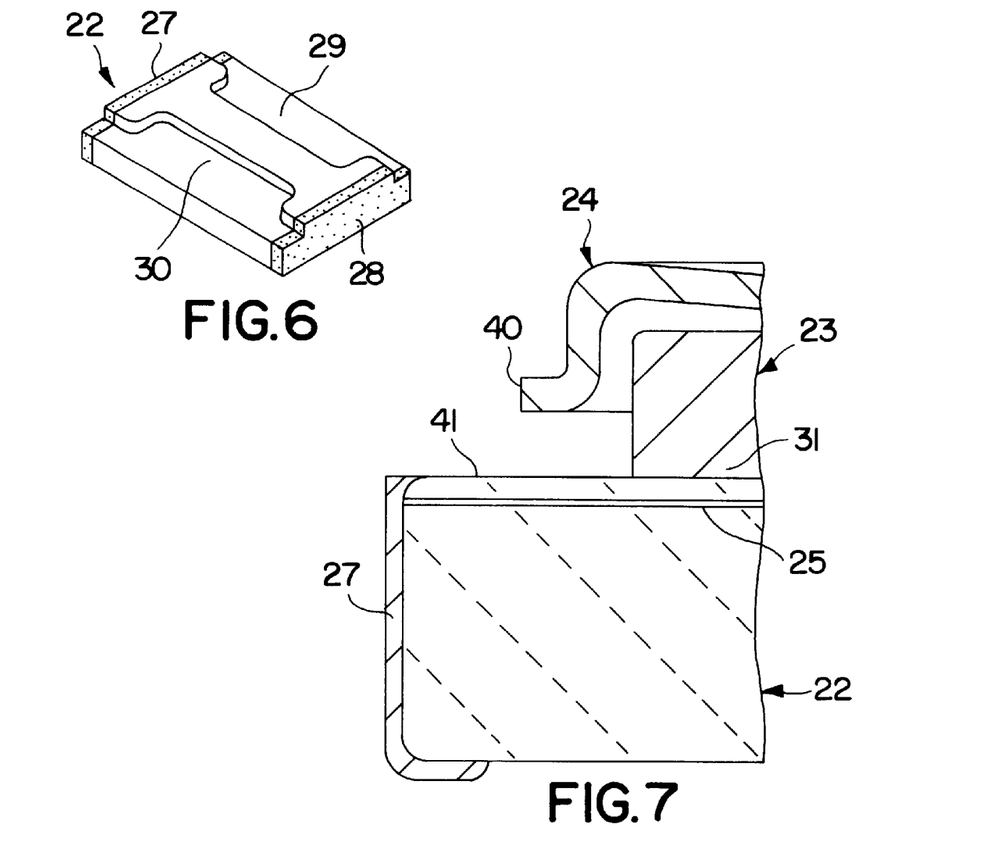
FIG. 6 is a perspective bottom view of the stator shown in FIG. 4.
FIG. 7 is a partially enlarged view of the variable capacitor of FIG. 3.

FIG. 7 shows the stator terminal 27 whose portion is removed as mentioned above. As shown in FIG. 7, as a result of such removal, a relatively long distance can be maintained between an upper end portion of the stator terminal 27 and the edge portion 40 of the cover 24 or between the upper end portion of the stator terminal 27 and a circumferential surface of the rotor 23. Accordingly, even when positioning between the stator 22 and the rotor 23 or between the stator 22 and the cover 24 involves an error in assembly of the variable capacitor 21 or when the rotor 23 or the cover 24 is dislocated during rotation of the rotor 22, the potential for short circuit can be reduced. Further, the potential for poor dielectric strength between the upper end portion of the stator terminal 27 and the edge portion 40 of the cover 24 of between the upper end portion of the stator terminal 27 and the circumferential surface of the rotor 23 can be likewise reduced.

In the present embodiment, portions of the stator terminals 27 and 28 located on the surface 41 of the stator 22 are removed using polishing, lapping, or like processing. However, only a portion of the stator terminal 27 located on the surface 41 should be removed.

Alternatively, the stator terminals 27 and 28 may be formed such that, to begin with, their conductive films do not extend onto the surface 41 of the stator 22. For example, conductive paste may be applied to the stator 22 while the surface 41 is masked. Alternatively, conductive paste may be selectively printed onto the stator 22.

Conductive films serving as the stator terminals 27 and 28 can be formed through application of conductive paste, wet plating, dry plating, or a like method, or a combination thereof.

Also, the stator terminals 27 and 28 can be formed of a material other than a conductive film. For example, a member such as a metallic foil or a metallic sheet can be used for the terminals 27 and 28.

In the above-described embodiment, being formed of a metal, the cover 24 and the rotor 23 serve as conductive passages for connecting the rotor electrode 31 to an external circuit through the rotor terminal 39 formed integrally with the cover 24. However, the cover 24 and the rotor 23 are not limited in structure thereto. For example, the entire rotor need not be formed of metal. The rotor can be formed of an electrical insulator such as alumina, and only a portion of the rotor can be formed of a conductor (e.g., only a portion necessary to establish the required electrical connection). Also, the entire cover need not be formed of a metal. The cover can be formed of an electrical insulator such as resin, for example, only its surface can be formed of a conductor.

Figure 8:
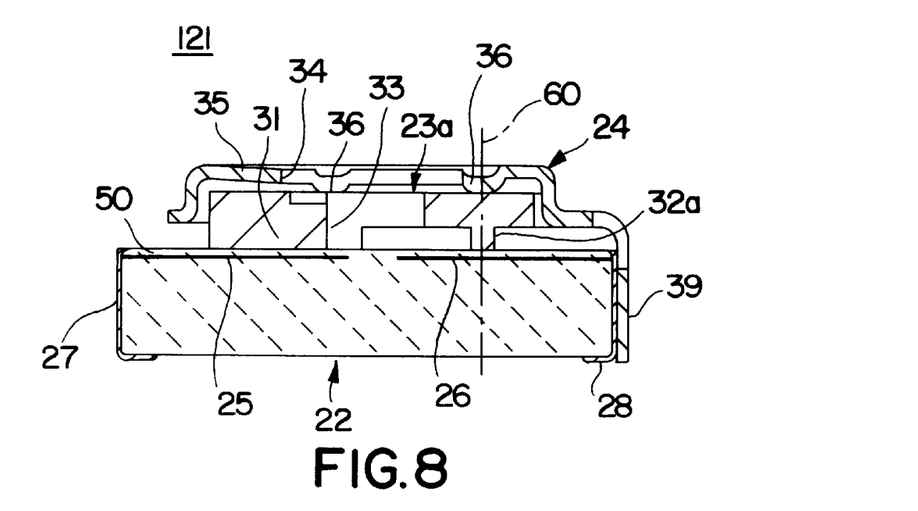
FIG. 8 is a sectional view of a variable capacitor according to a second exemplary embodiment of the present invention.
Figure 9:
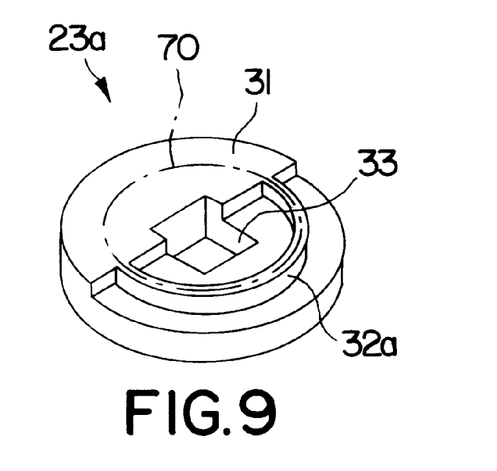
FIG. 9 is a perspective bottom view of the rotor used in the variable capacitor of FIG. 8.

FIGS. 8 and 9 illustrate a variable capacitor 121 according to an exemplary second embodiment of the present invention. In FIGS. 8 and 9, the same members as those of the first embodiment are denoted by common reference numerals, and their description will be omitted. FIG. 8 is a sectional view of the variable capacitor 121.

The variable capacitor 121 is primarily composed of a stator 22, a rotor 23a, and a cover 24. FIG. 9 shows a perspective bottom view of the rotor 23a. A major portion of the stator 22 is formed of a dielectric such as ceramic. The rotor 23a is formed of, for example, a copper alloy such as brass or like material.

A portion of a dielectric, which the stator 22 is made of, defines a dielectric layer 50 covering the stator electrodes 25 and 26.

The rotor 23a is placed on the stator 22 in such a manner that the rotor 23a comes into contact with the outer surface of the dielectric layer 50. As shown in FIG. 9, a substantially semicircular rotor electrode 31 projects out from the bottom side (as viewed in FIG. 8) of the rotor 23a so as to face the stator electrode 25 (or electrode 26) with the dielectric layer 50 disposed therebetween.

A protrusion 32a projecting out as far as the rotor electrode 31 is also formed on the bottom side of the rotor 23a in a region other than that where the rotor electrode 31 is formed. The protrusion 32a serves to prevent an inclination of the rotor 23a which would otherwise result due to the presence of the rotor electrode 31. In the present embodiment, the protrusion 32a extends integrally from the rotor electrode 31 in a circular arc form. The position of the protrusion 32a will be described later.

The thus-configured variable capacitor 121 is assembled in a manner similar to that of the first embodiment.

In the thus-assembled state, as shown in FIG. 8, the rotor electrode 31 faces the stator electrode 25 with the dielectric layer 50 disposed therebetween to thereby develop capacitance. In order to vary the capacitance through varying the effective overlapping area between the rotor electrode 31 and the stator electrode 25, the rotor 23a is rotated. The capacitance is externally "tapped" between the stator terminal 27 and the rotor terminal 39. The stator terminal 27 is electrically connected to the stator electrode 25. The rotor terminal 39 is integrated with the cover 24 which is in contact with the rotor 23a on which the rotor electrode 31 is formed.

In the assembled variable capacitor 121, by means of the protrusions 36 formed on the spring-action portion 35 of the cover 24, the spring-action portion 35 can apply a stable spring action on the rotor 23a. Accordingly, stable contact is established between the rotor 23a and the stator 22. That is, the protrusions 36 are in contact with the rotor 23a at fixed positions. As a result, even when the parallelism of the rotor 23a between the rotor-electrode side and the opposite side is poor or when the flatness of the rotor-electrode side or the opposite side of the rotor 23a or the flatness of a tip portion of the spring-action portion 35 is poor, the protrusions 36 press the rotor 23a at reliably fixed positions. Hence, such variations in machining do not have an appreciable impact and are thus effectively "absorbed," thereby applying a stable contact pressure to the rotor 23a.

Thus, the rotor 23a is uniformly pressed against the stator 22 over the entire surface of the rotor 23a. Therefore, the capacitance of the variable capacitor 121 is stabilized and varies smoothly with rotation of the rotor 23a, a setting position is stabilized (e.g., there is a reduced potential of drift), and the torque required to rotate the motor 23a becomes uniform.

Since the protrusions 36 substantially come into point contact with the rotor 23a, the area of contact between the protrusions 36 and the rotor 23a becomes relatively small, thereby increasing an apparent load of contact between the protrusions 36 and the rotor 23a. Accordingly, at the contact portions, adhesive wear is apt of occur, resulting in an increase in frictional resistance. Thus, torque required to rotate the rotor 23a can be increased, thereby reducing the potential of drift in the setting position.

In FIG. 8, the dot-and-dash line represents the position of a section of the spring-action portion 35 of the cover 24, which section comes into contact with the rotor 23a. More specifically, this line represents the position of a contact portion 60 of the protrusion 36 formed on the spring-action portion 35, which contact portion 60 comes into contact with the rotor 23a. As the rotor 23a rotates, the contact portion 60 sweeps out a circular trajectory 70 on the rotor 23a as represented by the dot-and-dash line in FIG. 9. As in the case of FIG. 16 described previously, FIG. 9 is a bottom view of the rotor 23a of FIG. 8. The circular trajectory 70 is a projection on the bottom side of the rotor 23a of a circular trajectory which is swept out on the upper surface (as viewed in FIG. 8) of the rotor 23a by the contact portion 60.

As shown in FIGS. 8 and 9, the position of the protrusion 32a formed on the lower surface of the rotor 23a is selected so as to substantially fall on the circular trajectory 70 which, as the rotor 23a rotates, is swept out on the rotor 23a by the contact portion 60 of the protrusion 36. Accordingly, a pressing force applied to the rotor 23a by the spring-action portion 35 through the protrusions 36 acts on the rotor 23a at a position corresponding to the protrusion 32a. Thus, the applied pressing force does not cause the rotor 23a to deform in a flexural manner.

In the above-described second embodiment, the protrusion 32a extends integrally from the electrode 31 and along the circular trajectory 70 in a continuous circular arc form. The form of the protrusion 32a is not limited thereto, but may be modified in various ways as described below.

Figures 10, 12:
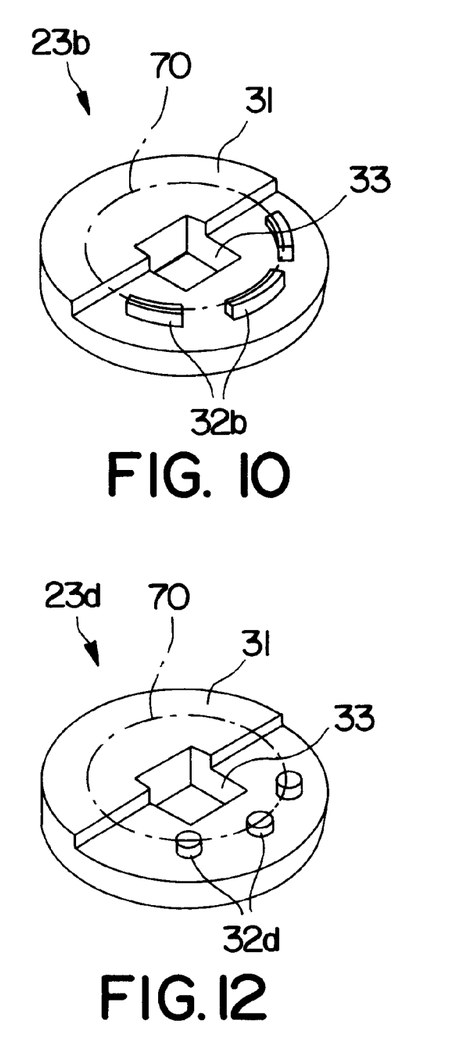
FIG. 10 is a perspective bottom view of the rotor used in a variable capacitor according to a third exemplary embodiment of the present invention.
FIG. 12 is a perspective bottom view of the rotor used in a variable capacitor according to a fifth exemplary embodiment of the present invention.
Figure 11:
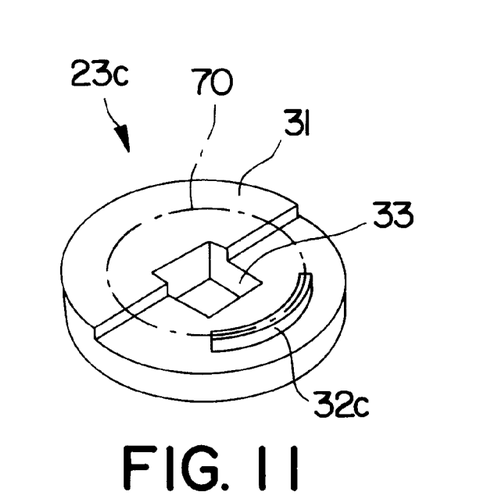
FIG. 11 is a perspective bottom view of the rotor used in a variable capacitor according to a fourth exemplary embodiment of the present invention.

FIGS. 10 to 12 show rotors used in variable capacitors according to third through fifth embodiments, respectively, of the present invention, and correspond to FIG. 9. The rotors shown in FIGS. 10 to 12 can replace the rotor 23a of FIG. 9 used in the variable capacitor 121 shown in FIG. 8. In FIGS. 10 to 12, the same features as those in FIG. 9 are denoted by common reference numerals, and their description will be omitted to avoid redundancy.

In FIG. 10, a protrusion 32b formed on a rotor 23b extends along the circular trajectory 70 in a circular arc form, but is divided at intermediate positions. In the embodiment of FIG. 10, the protrusion 32b is divided at two positions so as to form three portions.

The number of divisions of the protrusions 32b can be modified as desired. Also, an end division of the protrusion 32b can be extended integrally from the rotor electrode 31.

In FIG. 11, a protrusion 32c formed on a rotor 23c extends along the circular trajectory 70 in a continuous circular arc form, but is located away from the rotor electrode 31 (e.g., the protrusion 32c is not integrally connected to the rotor electrode 31). The arc length and position of the protrusion 32c can be modified as desired.

In FIG. 12, a plurality of protrusions 32d are formed on the rotor 23d along the circular trajector 70. The number, arrangement, and shape of the protrusions 32d can be modified as desired.

Also, two or more of the embodiments of FIGS. 10 to 12 can be combined to obtain a hybrid embodiment of the protrusion. Further, any of the embodiments in FIGS. 9–12 can be combined with the embodiment shown in FIG. 7.

The presence of the protrusion causes an increase in the minimum capacitance of the variable capacitor 121. Thus, the protrusions 32a, 32b, 32c, and 32d preferably have a small area of contact with the dielectric layer 50. Accordingly, the width of the protrusions 32a, 32b, and 32c is made as narrow as possible, and the diameter of the protrusions 32d is made as small as possible. Also, as in the case of the protrusions 32b, 32c, and 32d, through use of a protrusion extending intermittently, not continuously, along the circular trajectory 70 in a region other than that where the rotor electrode 31 is formed, the minimum capacitance is effectively reduced.

Elements other than the rotor used in the present invention can be modified as desired. That is, the protrusion feature can be applied to other types of variable capacitors beside the particular type shown in FIG. 8.

For example, it is preferred for stable contact with the rotor 23a that three or more protrusions 36 be arranged along the rotational direction of the rotor 23a. However, the number of the protrusions 36 can be one or two.

Also, a cover can be used having a spring-action portion on which such a protrusion is not formed.

In the above-described embodiments, being formed of a metal, the cover 24 and the rotor 23a serve as conductive passages for connecting the rotor electrode 31 to an external circuit through the rotor terminal 39 formed integrally with the cover 24. However, the cover 24 and the rotor 23a are not limited in structure thereto. For example, the entire rotor need not be formed of metal. The rotor can be formed of an electrical insulator such as alumina, and only a portion of the rotor can be formed of a conductor (e.g., only a portion necessary to establish the required electrical connection). In this case, at least a surface of the protrusion which comes into contact with the dielectric layer is left as an electrical insulator, so that the minimum capacitance is effectively reduced. In connection therewith, when the rotor is formed of metal, at least a surface of the protrusion which comes into contact with the dielectric layer can be coated with an insulator.

Also, the entire cover need not be formed of metal. The cover can be formed of an electrical insulator such as resin, and only a portion of the cover can be formed of a conductor (e.g., only a portion necessary to establish the required electrical contact). When a conductive passage for connecting the rotor electrode to an external circuit is formed on a portion other than the rotor or cover, the rotor and cover need not be formed of metal, either entirely or partially.

Further, the spring-action portion can be provided by a member other than the cover, for example, by a washer-like member having a spring property. In this case, the present invention may be applicable to a coverless variable capacitor so long as the rotor is held so that it can be rotated without the use of the cover.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

What is claimed is:

1. A variable capacitor comprising:

a stator formed of a dielectric having a stator electrode, and having a stator terminal electrically connected to the stator electrode and a dielectric layer of the stator formed so as to cover the stator electrode;

a rotor having a rotor electrode formed on a surface thereof which faces the stator electrode, wherein the dielectric layer is disposed between the rotor electrode and the stator electrode and an outer surface of the dielectric layer of the stator is in contact with the rotor electrode of the rotor; and a conductive cover which holds the rotor such that the rotor can be rotated relative to the stator for changing an effective overlapping area between the rotor electrode and the stator electrode, the conductive cover being attached to stator such that its edge portion faces the stator, and being electrically connected to the rotor electrode, wherein the stator terminal does not extend onto the outer surface of the dielectric layer of the stator which faces the edge portion of said cover.

2. A variable capacitor according to claim 1, wherein the stator is configured such that the stator terminal is formed on a side surface of the stator.

3. A variable capacitor according to claim 2, wherein the surface of the stator which faces the edge portion of the cover is adjacent to the side surface of the stator.

4. A variable capacitor according to claim 2, wherein a conductive film is formed on the side surface of the stator so as to serve as the stator terminal, and the thus-formed conductive film is partially removed so as not to extend onto the surface of the stator which faces the edge portion of the cover.

5. A variable capacitor comprising:

a stator having a stator electrode, and having a stator terminal electrically connected to the stator electrode;

a rotor having a rotor electrode which faces the stator electrode, wherein a dielectric is disposed between the rotor electrode and the stator electrode; and a conductive cover which holds the rotor such that the rotor can be rotated relative to the stator for changing an effective overlapping area between the rotor electrode and the stator electrode, the conductive cover being attached to the stator such that its edge portion faces the stator, and being electrically connected to the rotor electrode, wherein the stator terminal does not extend onto a surface of the stator which faces the edge portion of the cover, wherein an adjustment hole is formed in the cover so as to permit insertion of a tool for rotating the rotor, and a spring-action portion is formed around the adjustment hole in such a manner as to come into contact with the rotor to thereby press the rotor against the stator.

6. A variable capacitor comprising:

a stator including a stator electrode, a stator terminal connected electrically to the stator electrode, and a dielectric layer formed so as to cover the stator electrode;

a conductive rotor which is placed on the stator in such a manner as to come into contact with an outer surface of the dielectric layer, and which has a rotor electrode and a protrusion, the rotor electrode projecting out from a surface of the rotor, which surface faces the outer surface of the dielectric layer, so as to face the stator electrode with the dielectric layer disposed therebetween, the protrusion being formed so as to extend out as far as the rotor electrode on the surface of the rotor in a region other than that where the rotor electrode is formed, and the rotor being secured so that it can rotate relative to the stator in order to vary an effective overlapping area between the rotor electrode and the stator electrode;

a conductive cover which is attached to the stator such that an edge portion of the conductive cover faces the stator, and which is electrically connected to the rotor electrode; and a spring-action portion in contact with a surface of the rotor opposite the surface of the rotor on which the rotor electrode and the protrusion are formed, to thereby apply a spring force which presses the rotor against the stator, wherein the stator terminal is formed in such a manner that the stator terminal does not extend onto a surface of the stator which faces the edge portion of the cover, and wherein the position of the protrusion is selected so as to substantially fall on a circular trajectory which, as the rotor rotates, is swept out on the rotor by a section of the spring-action portion, which section is in contact with the rotor.

7. A variable capacitor according to claim 6, wherein the stator is formed of a dielectric and is configured such that the stator electrode is formed internally within the stator, and such that the stator terminal is formed on a side surface of the stator.

8. A variable capacitor according to claim 7, wherein the surface of the stator which faces the edge portion of the cover is adjacent to the side surface of the stator.

9. A variable capacitor according to claim 7, wherein a conductive film is formed on the side surface of the stator so as to serve as the stator terminal, and the thus-formed conductive film is partially removed so as not to extend onto the surface of the stator which faces the edge portion of the cover.

10. A variable capacitor according to claim 6, wherein the protrusion extends in a circular arc form along the circular trajectory.

11. A variable capacitor according to claim 10, wherein the protrusion extends integrally from the rotor electrode.

12. A variable capacitor according to claim 10, wherein the protrusion extends in a continuous circular arc form.

13. A variable capacitor according to claim 10, wherein the protrusion extends in an intermittent circular arc form.

14. A variable capacitor according to claim 6, wherein the protrusion is composed of a plurality of protrusions arranged along the circular trajectory.

15. A variable capacitor according to claim 6, further comprising an adjustment hole formed in the cover so as to permit insertion of a tool for rotating the rotor, and the spring-action portion is formed around the adjustment hole.

16. A variable capacitor according to claim 6, wherein the spring-action portion has a protrusion which substantially comes into point contact with the rotor.

17. A variable capacitor according to claim 16, wherein the spring-action portion has at least the three protrusions arranged along a rotational direction of the rotor.

* * * * *